United States Patent
Tan et al.

(10) Patent No.: US 12,401,745 B2
(45) Date of Patent: Aug. 26, 2025

(54) AUTOMATIC REDACTION AND UN-REDACTION OF DOCUMENTS

(71) Applicant: MOTOROLA SOLUTIONS, INC., Chicago, IL (US)

(72) Inventors: Woei Chyuan Tan, Bayan Lepas (MY); Moh Lim Sim, Bayan Lepas (MY); Kin Hee Woo, Gelang Patah (MY); Carmen Jia Yi Siau, Kota Kinabalu (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 475 days.

(21) Appl. No.: 17/935,941

(22) Filed: Sep. 28, 2022

(65) Prior Publication Data

US 2024/0106931 A1    Mar. 28, 2024

(51) Int. Cl.
*H04M 3/436* (2006.01)
*G06F 40/289* (2020.01)
*H04M 3/22* (2006.01)

(52) U.S. Cl.
CPC ........ *H04M 3/4365* (2013.01); *G06F 40/289* (2020.01); *H04M 3/2281* (2013.01); *H04M 2201/40* (2013.01); *H04M 2201/42* (2013.01)

(58) Field of Classification Search
CPC ............. H04M 3/4365; H04M 3/2281; H04M 2201/40; H04M 2201/42; G06F 40/289
See application file for complete search history.

(56) References Cited

U.S. PATENT DOCUMENTS

| | | | |
|---|---|---|---|
| 9,762,651 B1 | 9/2017 | Sharifi et al. | |
| 12,106,393 B1* | 10/2024 | Ward | G06Q 50/265 |
| 12,170,082 B1* | 12/2024 | Koledin | H04M 7/006 |
| 2002/0161597 A1* | 10/2002 | Klibaner | G06Q 50/182 |
| | | | 705/309 |
| 2006/0075228 A1* | 4/2006 | Black | H04L 63/104 |
| | | | 713/167 |
| 2016/0021249 A1* | 1/2016 | Govande | H04W 4/16 |
| | | | 455/414.1 |
| 2017/0337352 A1 | 11/2017 | Williams | |
| 2017/0353423 A1* | 12/2017 | Morrison | H04L 51/214 |
| 2018/0336643 A1* | 11/2018 | Li | G06Q 10/02 |

* cited by examiner

*Primary Examiner* — Wesley L Kim
*Assistant Examiner* — Fabian Botello

(57) ABSTRACT

A method and apparatus for redacting documents is provided herein. During operation, a call is received from a caller and an identity of the caller is determined. Electronic paperwork related to a particular incident is retrieved. Witness statements from the caller along with past correspondences of the caller are analyzed to determine the caller's knowledge of the incident. Redaction of the electronic paperwork then takes place based on the caller's knowledge of the incident. In particular, items such as addresses, phone numbers, times, places, . . . , etc. that are potentially unknown to the caller are redacted so that the called party will not inadvertently disclose this information to the caller.

10 Claims, 5 Drawing Sheets

CASE NUMBER: VT 05/04/01/3462

INCIDENT: VEHICLE THEFT

REPORTING OFFICER: CONSTABLE RENT ARTICLE    DATE OF REPORT: 06 FEBRUARY 2003

AT ABOUT 1040HRS ON 5 APRIL 2001, I MEET WITH MS. VANESSA KAHN AT 61 SOUTHSIDE DRIVE REGARDING A VEHICLE THEFT. MS.███SAID SHE PARKED HER CAR BY A PARKING METER OUTSIDE SOUTHSIDE SHOPPING CENTER AT ABOUT 0945 HOURS AND WENT INTO A NEARBY SHOP TO RETURN A FAULTY TORCH SHE HAD PURCHASED THE PREVIOUS DAY. SHE SAID THAT WHEN SHE RETURNED TO THE LEISURE CENTRE AT ABOUT 1000 HOURS, SHE DISCOVERED HER CAR WAS MISSING.

MS.███DESCRIBED HER CAR AS ███████████████████████ WITH ██████████REGISTERED IN THE UK, THE CAR REGISTRATION NUMBER ███ SHE ESTIMATED THE VALUE OF THE CAR AT C19,500 AND SAID THERE WERE NO DISTINGUISHING MARKS OR ITEMS.

MS.███ TOLD ME SHE LOCKED THE CAR, BUT SHE DOES NOT HAVE THE KEYS, SHE NOW BELIEVES SHE MAY HAVE██████████REMOVING THE FAULTY TORCH FROM THE BOOT. MS.████████████████████████████████████ CAR, AND SHE IS UP TO DATE WITH HER LOAN REPAYMENTS.

I CONDUCTED A SURVEY OF THE CRIME SCENE BUT FOUND NO ITEMS OF EVIDENCE. I SAW NO████████████AND THERE WERE NO ITEMS TO RETRIEVE OR PHOTOGRAPH.

I OBTAINED A SWORN STATEMENTS FROM MS. KAHN AND PROVIDED HER WITH THE CASE NUMBER AND INFORMATION LEAFLET 99/07 ("WHAT TO DO WHEN YOUR CAR IS STOLEN"). I ENTERED THE VEHICLE INTO THE STATION DATABASE AS A STOLEN VEHICLE. I ALSO SEARCHED THE AREA BUT WAS UNABLE TO FIND THE VEHICLE. I ALSO SEARCHED THE AREA BUT WAS████████████████

CASE NUMBER: VT 05/04/01/3462

INCIDENT: VEHICLE THEFT

REPORTING OFFICER: CONSTABLE RENT ARTICLE    DATE OF REPORT: 06 FEBRUARY 2003

AT ABOUT 1040HRS ON 5 APRIL 2001, I MEET WITH MS. VANESSA KAHN AT 61 SOUTHSIDE DRIVE REGARDING A VEHICLE THEFT. MS.███SAID SHE PARKED HER CAR BY A PARKING METER OUTSIDE SOUTHSIDE SHOPPING CENTER AT ABOUT 0945 HOURS AND WENT INTO A NEARBY SHOP TO RETURN A FAULTY TORCH SHE HAD PURCHASED THE PREVIOUS DAY. SHE SAID THAT WHEN SHE RETURNED TO THE LEISURE CENTRE AT ABOUT 1000 HOURS, SHE DISCOVERED HER CAR WAS MISSING.

MS.███DESCRIBED HER CAR AS ███████████████████████ WITH ███████REGISTERED IN THE UK, THE CAR REGISTRATION NUMBER ███ SHE ESTIMATED THE VALUE OF THE CAR AT C19,500 AND SAID THERE WERE NO DISTINGUISHING MARKS OR ITEMS.

MS.███ TOLD ME SHE LOCKED THE CAR, BUT SHE DOES NOT HAVE THE KEYS, SHE NOW BELIEVES SHE MAY HAVE███████REMOVING THE FAULTY TORCH FROM THE BOOT. MS.█████████████████ CAR, AND SHE IS UP TO DATE WITH HER LOAN REPAYMENTS.

I CONDUCTED A SURVEY OF THE CRIME SCENE BUT FOUND NO ITEMS OF EVIDENCE. I SAW NO███████AND THERE WERE NO ITEMS TO RETRIEVE OR PHOTOGRAPH.

I OBTAINED A SWORN STATEMENTS FROM MS. KAHN AND PROVIDED HER WITH THE CASE NUMBER AND INFORMATION LEAFLET 99/07 ("WHAT TO DO WHEN YOUR CAR IS STOLEN"). I ENTERED THE VEHICLE INTO THE STATION DATABASE AS A STOLEN VEHICLE. I ALSO SEARCHED THE AREA BUT WAS UNABLE TO FIND THE VEHICLE.

AUTOMATIC REDACTION AND UN-REDACTION OF DOCUMENTS

BACKGROUND OF THE INVENTION

Oftentimes public-safety officers will need to speak with various witnesses and victims about a particular incident. During these conversations, the officers regularly need to access documents such as incident reports, victim statements, . . . , etc. Many of these documents comprise information that should not be discussed with those who are not already aware of the information. It would be beneficial to be able to automatically redact such information from a document so that the information is not mistakenly provided to a person during a conversation. In a similar manner, it would be beneficial if information can be un-redacted from documents when it is revealed that a person has knowledge of the information.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 illustrates redaction.

FIG. 2 illustrates redaction.

Figure 3:
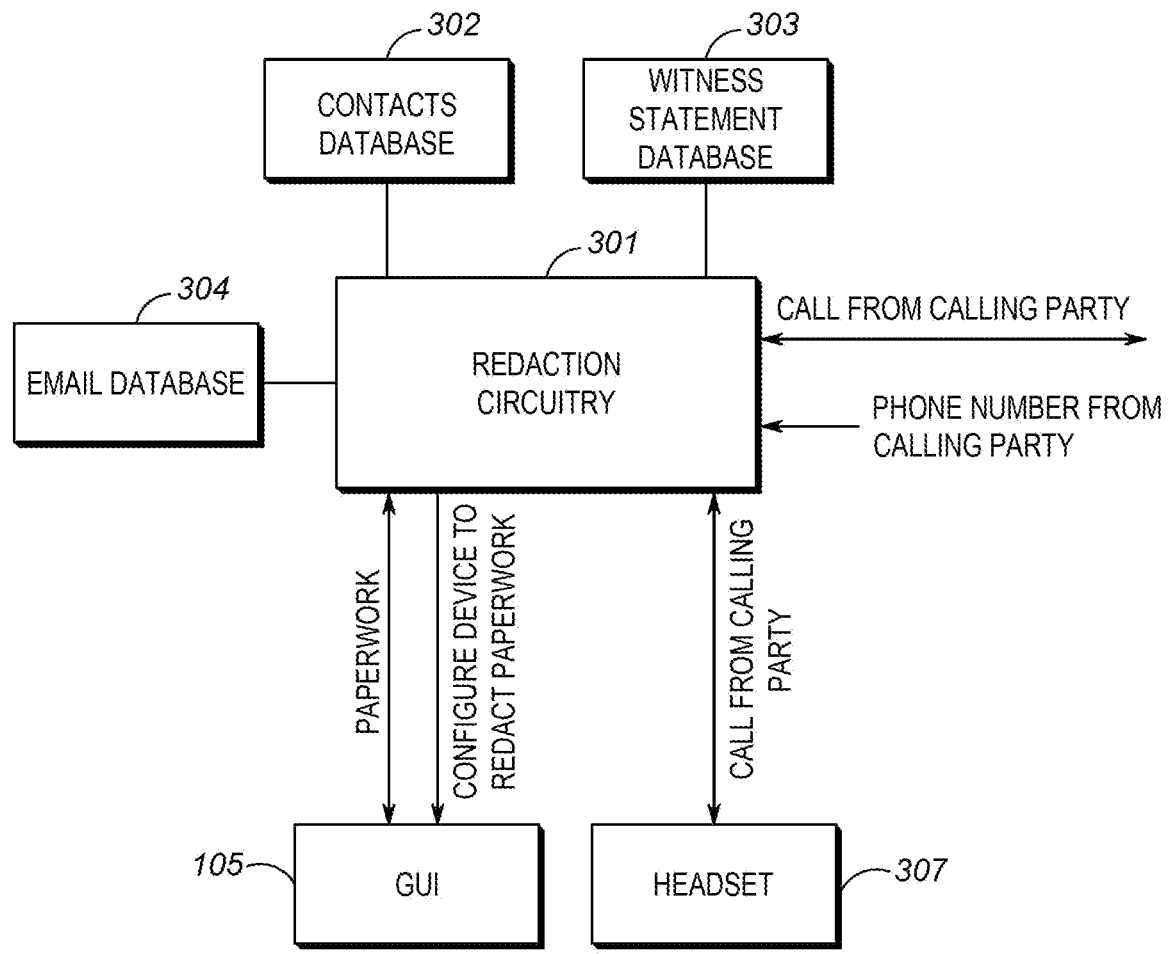
FIG. 3 is a block diagram of an apparatus used for redaction.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for redacting an un-redacting documents is provided herein. During operation, a call is received from a caller and an identity of the caller is determined. Electronic paperwork related to a particular incident is retrieved. Witness statements from the caller along with past correspondences of the caller are analyzed to determine the caller's knowledge of the incident. Redaction of the electronic paperwork then takes place based on the caller's knowledge of the incident. In particular, items such as addresses, phone numbers, times, places, . . . , etc. that are potentially unknown to the caller are redacted so that the called party will not inadvertently disclose this information to the caller.

In a further embodiment, the ongoing phone conversation with the caller is analyzed and un-redaction of the electronic paperwork then takes place based on the conversation with the caller. More particularly, if during the conversation, the caller reveals that they have additional knowledge of the incident, portions of the electronic paperwork related to the additional knowledge will be un-redacted.

Consider the following example: Officer Smith is sitting at her desk and receives a call from a person wishing to talk about a particular incident (e.g., a stolen car). The identity of the caller will be determined, and various databases will be analyzed to determine what the caller knows about the particular incident. If Officer Smith pulls up, for example, an incident report on their desktop, the incident report will be redacted based on what the caller knows about the particular incident. In a further embodiment of the present invention, if the caller and Officer Smith engage in conversation, that conversation will be analyzed to determine if the caller discloses further knowledge of the particular incident, and if so, that information within the incident report will be un-redacted. This is illustrated in FIG. 1 and FIG. 2.

As shown in FIG. 1 an electronic document has various text redacted by blacking it out (although other forms of redaction and/or highlighting may be used). More particularly, the electronic document comprises redacted text 101 and non-redacted text 102 being displayed on graphical-user-interface (GUI) 105 which may comprise a computer monitor. As discussed above, the redacted text may be based on a caller's knowledge of the contents of the electronic document being displayed on GUI 105 such that information unknown to the caller (and not wishing to be disclosed) is redacted.

As the ongoing phone conversation progresses, material may be un-redacted if the caller indicates knowledge of the redacted content. This is illustrated in FIG. 2 where previously redacted content 101 has been un-redacted. For example, assume that redacted content 101 of FIG. 1 comprises a description of a suspect of a crime. Assume that the caller provides the same description of the suspect. It is then known that the caller knows the information contained within the redacted content 101, and such information may be un-redacted.

FIG. 3 is a block diagram of an apparatus 300 used for redaction. As shown in FIG. 3, apparatus 300 comprises various databases such as, but not limited to, contacts database 302, witness statement database 303, and email database 304. Contacts database 302 comprises a standard list of names and their associated phone numbers, email addresses, physical addresses, . . . , etc. Witness statement database comprises electronic documents of past witness statements identified by who made the statement and an incident that the statement is associated with. Finally, email database comprises past emails received from various individuals.

During operation, redaction circuitry 301 receives a call along with the phone number from the caller and routes it to headset 307 (speaker/microphone). Redaction circuitry 301 accesses contacts database to associate the phone number with an identity of a person, and then searches email database 304 and witness statement database 303 for emails and witness statements made by the identified person.

Any electronic paperwork sent, or displayed by GUI 105 (e.g., an incident report) will have content such as names, addresses, descriptions of individuals and suspects, . . . , etc. redacted unless these items have been mentioned by the person in past email correspondences or witness statements. With this in mind, redaction circuitry sends instructions to GUI 105 to configure the electronic paperwork to redact appropriate material. In an alternate embodiment, redaction circuitry 301 makes such redactions before sending the electronic paperwork to GUI 105.

In another embodiment of the present invention, redaction circuitry 301 will analyze the ongoing call and attempt to determine if the caller has knowledge of any content that was redacted. If so, the paperwork will be modified to un-redact the additional knowledge. For example, if an address has been redacted, and the caller mentions the address, then the address can be un-redacted within the electronic paperwork.

Figure 4:
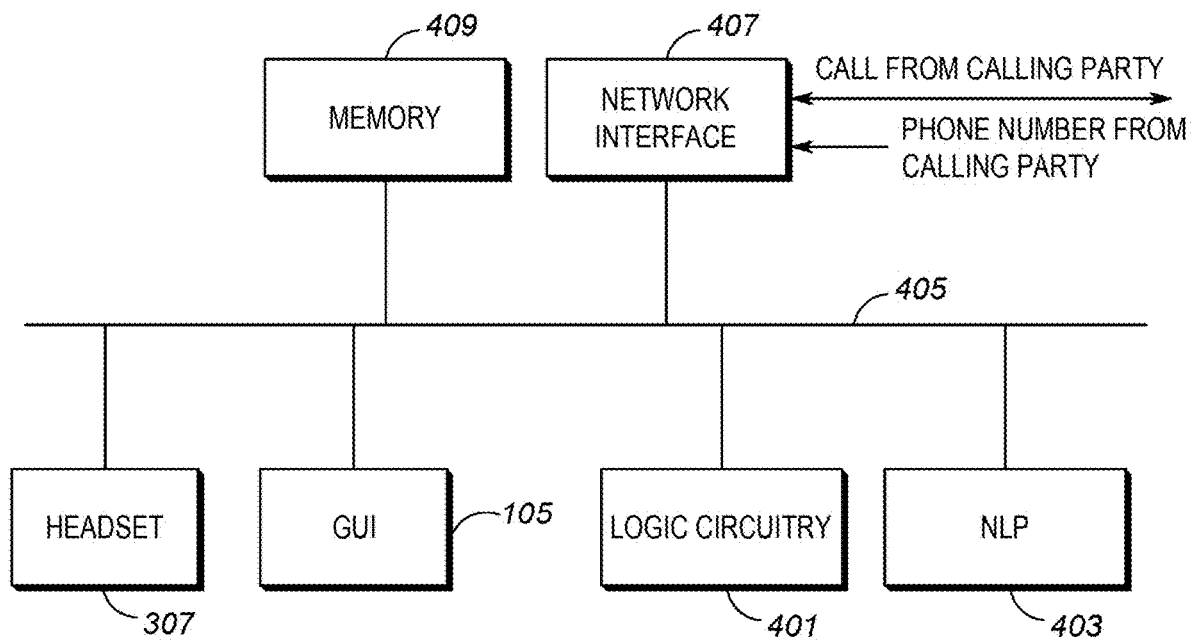
FIG. 4 is a more-detailed block diagram of the apparatus of FIG. 3

FIG. 4 is a more-detailed block diagram of apparatus 300. In various examples, apparatus 300 may comprise a computer, a mobile telephone, a smart phone, or any device capable of performing redaction and/or un-redaction as described above. Apparatus 300 is also capable of executing instructions (sequential or otherwise) that specify actions to be taken by the apparatus.

Apparatus 300 may include various components connected by bus 405. Apparatus 300 may include a hardware processor (logic circuitry) 401 such as one or more central processing units (CPUs) or other processing circuitry 401 able to provide any of the functionality described herein when running instructions. Logic circuitry 401 serves as a redaction server. Memory 409 is also utilized to store email database 304, contacts database 302, and witness statement database 303.

Processor 401 is connected to memory 409 that may include a non-transitory machine-readable medium on which is stored one or more sets of instructions. Memory 409 may include one or more of static or dynamic storage, or removable or non-removable storage, for example. A machine-readable medium may include any medium that is capable of storing, encoding, or carrying instructions for execution by processor 401, such as solid-state memories, magnetic media, and optical media. Machine-readable medium may include, for example, Electrically Programmable Read-Only Memory (EPROM), Random Access Memory (RAM), or flash memory.

The instructions may enable apparatus 300 to operate in any manner thus programmed, such as the functionality described specifically herein, when processor 401 executes the instructions. The machine-readable medium may be stored as a single medium or in multiple media, in a centralized or distributed manner. In some embodiments, instructions may further be transmitted or received over a communications network via a network interface 407 utilizing any one of a number of transfer protocols (e.g., frame relay, internet protocol (IP), transmission control protocol (TCP), user datagram protocol (UDP), hypertext transfer protocol (HTTP), etc.).

Network interface 407 may thus enable apparatus 300 to communicate with a caller through any network (not shown). Network interface 407 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which apparatus 300 may be connected via network interface 407 may include a local area network (LAN), a wide area network (WAN), a packet data network (e.g., the Internet), mobile telephone networks (e.g., cellular networks), and wireless data networks.

Apparatus 300 may further include one or more graphical user interfaces (GUIs) 105 for displaying redacted content and non-redacted content. For example, GUI 105 may provide a way of conveying (e.g., displaying) electronic paperwork received from memory 409. Part of this information may comprise electronic content that has been redacted as described herein. In order to provide the above features (and additional features), GUI 105 may comprise any combination of a touch screen, a computer screen, a keyboard, or any other interface needed to receive a user input and provide information to the user.

Apparatus 300 also includes natural-language processor (NLP) 403 that comprises well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Headset 307 comprises a standard speaker and microphone combination that serves to receive a call from a caller, and provide a means for a user to engage in a conversation with the caller. It should be noted that in alternate embodiments headset 307 may be replaced by any other technology such as, but not limited to, a smart phone, a landline phone, . . . , etc.

During operation GUI 105 receives a phone call from a calling party. Logic circuitry 401 (serving as redaction server 301) accesses memory 409 (contacts database 302) to determine a caller's identity. Logic circuitry 401 then retrieves electronic paperwork from memory 409. As described above, the electronic paperwork may comprise redacted and non-redacted content, and may be redacted, or further redacted by logic circuitry 401.

As discussed above, the electronic paperwork may have had the redactions made based on past statements from the calling party, or logic circuitry 401 may redact, or further redact the electronic paperwork. When redaction takes place, logic circuitry 401 will access a contacts list to associate the caller's number with a particular person. Past emails and witness statements to/from the caller will be analyzed to determine a knowledge base for the caller, and the electronic paperwork will be redacted as described above prior to providing the paperwork to GUI 105. More particularly, if a piece of knowledge was mentioned in any past statements by the caller, then the material will be un-redacted, or not redacted from the electronic paperwork.

It should be noted that the electronic paperwork may be stored redacted or un-redacted and redaction, further redaction, and un-redaction may take place at various times. For example, if paperwork is stored after having been redacted, then logic circuitry 401 may un-redact the paperwork based on past statements stored in memory 409, and also un-redact the paperwork based on an ongoing conversation with a caller.

When un-redaction takes place based on an ongoing conversation, NLP 403 will provide logic circuitry 401 words and phrases mentioned by the caller. Logic circuitry 401 will then determine if such words or phrases have been redacted from the electronic paperwork, and if so, logic circuitry will un-redact the words or phrases from the electronic paperwork, so that GUI will display the un-redacted content in real time as the call progresses.

With the above in mind, FIG. 4 shows an apparatus comprising a network interface configured to receive a call from a caller, a graphical-user interface configured to display electronic paperwork with redacted and non-redacted content, and natural-language processing circuitry configured to determine words and phrases mentioned within the call. Logic circuitry is provided and configured to determine if the words or phrases mentioned within the ongoing call have been redacted from the electronic paperwork and un-redact those words or phrases that have been redacted from the electronic paperwork based on the words or phrases being mentioned in ongoing the call.

A witness-statement database may be provided, and the logic circuitry may be further configured to redact words and phrases from the electronic paperwork based on past statements by the caller such that if the caller mentioned the word or phrases in a past statement, they will not be redacted from the electronic paperwork.

An email database may be provided and the logic circuitry may be further configured to redact words and phrases from the electronic paperwork based on past emails to and from the caller such that if the caller mentioned the word or phrases within a past email, they will not be redacted from the electronic paperwork.

As discussed above, electronic paperwork may be stored as redacted content, and un-redacted based on various past statements and a current conversation. When this is the case apparatus 300 comprises a network interface configured to receive a call from a caller, a database comprising past statements from the caller, a graphical-user interface configured to display electronic paperwork with redacted and non-redacted content, and natural-language processing circuitry configured to determine content of a conversation with the caller. Logic circuitry is provided and configured to redact the electronic paperwork analyze the database and un-redact words and phrases from the electronic paperwork based on past statements by the caller such that if the caller mentioned the word or phrases, they will not be redacted from the electronic paperwork, determine if the caller mentions words or phrases that have been redacted from the electronic paperwork, and un-redact those words or phrases that have been redacted from the electronic paperwork based on the words or phrases being mentioned in the call.

Figure 5:
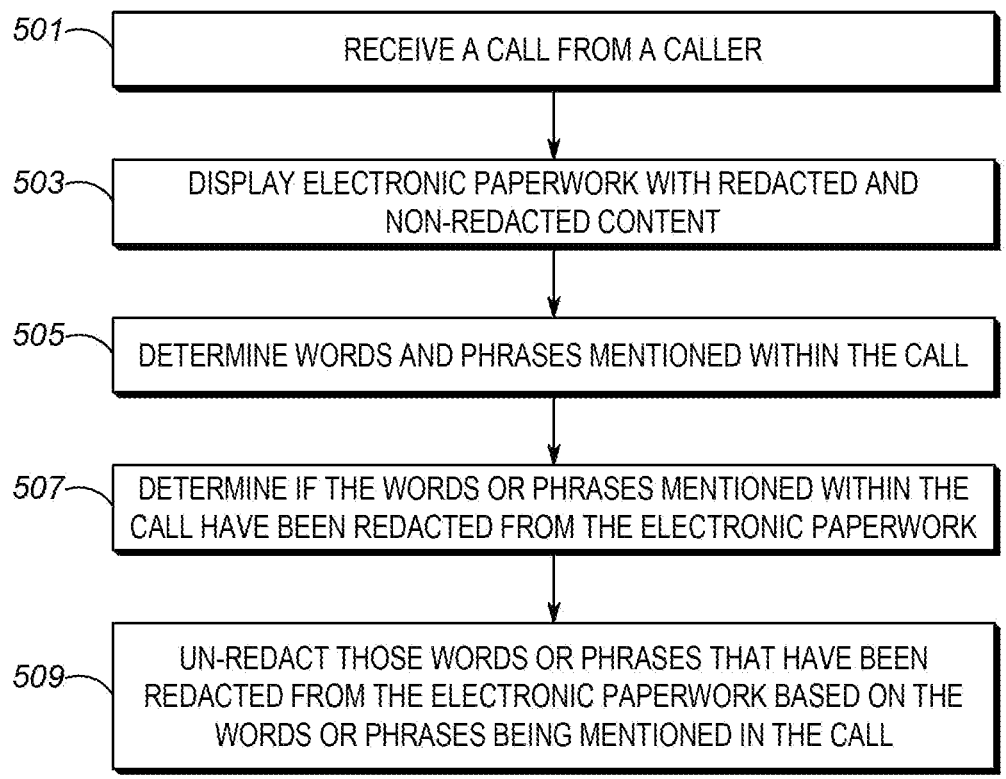
FIG. 5 is a flow chart showing operation of the apparatus of FIG. 4.

FIG. 5 is a flow chart showing operation of the apparatus of FIG. 1. The logic flow begins at step 501 where network interface 407 receives a call from a caller and routes it to headset 307. At step 503, GUI 105 displays electronic paperwork with redacted and non-redacted content. Logic circuitry 401 then determines words and/or phrases mentioned within the call (step 505) and determines if the words or phrases mentioned within the call have been redacted from the electronic paperwork (step 507). Finally, at step 509 logic circuitry 401 un-redacts those words or phrases that have been redacted from the electronic paperwork based on the words or phrases being mentioned in the call so that GUI 105 now displays the un-redacted content.

As discussed above, logic circuitry 401 may also redact words and phrases from the electronic paperwork based on past statements by the caller such that if the caller mentioned the word or phrases in a past statement, they will not be redacted from the electronic paperwork.

Additionally, the past statements by the caller may comprise a past statements made in an email, or made within a witness statement.

In the foregoing specification, specific embodiments have been described. However, one of ordinary skill in the art appreciates that various modifications and changes can be made without departing from the scope of the invention as set forth in the claims below. For example, instead of redacting text by blacking it out, one of ordinary skill in the art will recognize that such text may simply be highlighted in a particular color, underlined, or otherwise distinguished from normal text. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a network interface configured to receive a call from a caller;
a graphical-user interface configured to display electronic paperwork with redacted and non-redacted content;
natural-language processing circuitry configured to determine words and phrases mentioned within the call as the call is taking place;
logic circuitry configured to:
 determine if the words or phrases mentioned within the call have been redacted from the electronic paperwork; and
 un-redact those words or phrases that have been redacted from the electronic paperwork based on the words or phrases being mentioned in the call.

2. The apparatus of claim 1 further comprising:
a witness-statement database; and
wherein the logic circuitry is further configured to:
 redact words and phrases from the electronic paperwork based on past statements by the caller such that if the caller mentioned the word or phrases in a past statement, they will not be redacted from the electronic paperwork.

3. The apparatus of claim 1 further comprising:
an email database; and
wherein the logic circuitry is further configured to:
 redact words and phrases from the electronic paperwork based on past emails to and from the caller such that if the caller mentioned the word or phrases within a past email, they will not be redacted from the electronic paperwork.

4. An apparatus comprising:
a network interface configured to receive a call from a caller;
a database comprising past statements from the caller;
a graphical-user interface configured to display electronic paperwork with redacted and non-redacted content;
natural-language processing circuitry configured to determine content of an ongoing conversation with the caller; and
logic circuitry configured to:
 redact the electronic paperwork;
 analyze the database and un-redact words and phrases from the electronic paperwork based on past statements by the caller such that if the caller mentioned the word or phrases, they will not be redacted from the electronic paperwork;
 determine if the caller mentions words or phrases in an ongoing call that have been redacted from the electronic paperwork; and
 un-redact those words or phrases that have been redacted from the electronic paperwork based on the words or phrases being mentioned in the call.

5. The apparatus of claim 4 wherein the database comprises an email database.

6. The apparatus of claim 4 wherein the database comprises a witness-statement database.

7. A method comprising the steps of:
receiving a call from a caller;
displaying electronic paperwork with redacted and non-redacted content;
determining words and phrases mentioned within the call;
determining if the words or phrases mentioned within the call have been redacted from the electronic paperwork; and
un-redacting those words or phrases that have been redacted from the electronic paperwork based on the words or phrases being mentioned in the call.

8. The method of claim 7 further comprising the step of:
redacting words and phrases from the electronic paperwork based on past statements by the caller such that if the caller mentioned the word or phrases in a past statement, they will not be redacted from the electronic paperwork.

9. The method of claim 8 wherein the past statements by the caller comprise past statements made in an email.

10. The method of claim 8 wherein the past statements by the caller comprise past statements made within a witness statement.

* * * * *